(12) United States Patent
Wen et al.

(10) Patent No.: US 10,425,175 B2
(45) Date of Patent: Sep. 24, 2019

(54) TRANSMISSION CONTROL METHOD AND APPARATUS

(71) Applicant: Huawei Technologies Co., Ltd., Shenzhen (CN)

(72) Inventors: Fan Wen, Chengdu (CN); Lanjie Yuan, Shenzhen (CN); Huang Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 142 days.

(21) Appl. No.: 15/594,321

(22) Filed: May 12, 2017

(65) Prior Publication Data

US 2017/0250764 A1 Aug. 31, 2017

Related U.S. Application Data

(63) Continuation of application No. PCT/CN2014/091159, filed on Nov. 14, 2014.

(51) Int. Cl.
*G06F 11/00* (2006.01)
*H04B 17/309* (2015.01)
(Continued)

(52) U.S. Cl.
CPC ............ *H04B 17/309* (2015.01); *H04B 7/26* (2013.01); *H04J 11/0073* (2013.01);
(Continued)

(58) Field of Classification Search
CPC ... H04B 17/309; H04B 7/26; H04W 72/0413; H04W 72/042; H04W 72/0453; H04L 43/16; H04J 11/0073
(Continued)

(56) References Cited

U.S. PATENT DOCUMENTS

| 5,754,961 A * | 5/1998 | Serizawa | H04B 7/26 370/343 |
| 6,049,721 A * | 4/2000 | Serizawa | H04B 7/26 455/509 |

(Continued)

FOREIGN PATENT DOCUMENTS

| CN | 1498463 A | 5/2004 |
| CN | 103874085 A | 6/2014 |

(Continued)

*Primary Examiner* — Chuong T Ho
(74) *Attorney, Agent, or Firm* — Leydig, Voit & Mayer, Ltd.

(57) ABSTRACT

A transmission control method is disclosed. The transmission control method includes: sending, by a base station, downlink data to a terminal at a high frequency when detecting that the downlink data needs to be transmitted at the high frequency; and sending, by the terminal to the base station at the high frequency, control information used for assisting the base station in improving transmission quality of the high frequency downlink data, so that the base station controls a transmission process of the high frequency downlink data according to the control information. Embodiments of the present invention further disclose a base station and a terminal. By means of the present invention, a terminal can rapidly feed back control information at a high frequency in a process in which downlink data is transmitted at a high frequency, and a feedback time is short.

17 Claims, 5 Drawing Sheets

(51) Int. Cl.
  *H04B 7/26*   (2006.01)
  *H04J 11/00*  (2006.01)
  *H04L 12/26*  (2006.01)
  *H04W 72/04*  (2009.01)

(52) U.S. Cl.
  CPC ........... *H04L 43/16* (2013.01); *H04W 72/042* (2013.01); *H04W 72/0413* (2013.01); *H04W 72/0453* (2013.01)

(58) Field of Classification Search
  USPC ........................................ 370/252, 253, 254
  See application file for complete search history.

(56) References Cited

U.S. PATENT DOCUMENTS

| | | | | |
|---|---|---|---|---|
| RE44,143 E | * | 4/2013 | Serizawa | H04B 7/26 370/468 |
| RE44,202 E | * | 5/2013 | Serizawa | H04B 7/26 455/509 |
| 2002/0173290 A1 | | 11/2002 | Nascimbene | |
| 2006/0009230 A1 | * | 1/2006 | Fukumoto | H04W 72/02 455/452.1 |
| 2011/0034177 A1 | * | 2/2011 | Oh | H04J 11/0086 455/450 |
| 2015/0089048 A1 | * | 3/2015 | Jackson | H04L 47/25 709/224 |

FOREIGN PATENT DOCUMENTS

| | | |
|---|---|---|
| EP | 1244231 A1 | 9/2002 |
| EP | 1605726 B1 | 12/2005 |
| EP | 2262334 A1 | 12/2010 |
| JP | H08274700 A | 10/1996 |
| WO | WO 2012020971 A1 | 2/2012 |
| WO | 2014124164 A1 | 8/2014 |

* cited by examiner

| Channel type | Channel name | Brief introduction to a function |
|---|---|---|
| Control channel | PRACH (random access channel) | Preamble detection information and SYNC-UL |
| | PUCCH (physical uplink control channel) | Transmit uplink user control information, including a CSI channel estimation sequence, CQI, ACK/NAK feedback, a beam ID, a scheduling request, and the like. |

TRANSMISSION CONTROL METHOD AND APPARATUS

CROSS-REFERENCE TO RELATED APPLICATIONS

This Application is a continuation of International Application No. PCT/CN2014/091159, filed on Nov. 14, 2014, the disclosure of which is hereby incorporated by reference in its entirety.

TECHNICAL FIELD

The present invention relates to the field of mobile communications, and in particular, to a transmission control method and an apparatus.

BACKGROUND

With development of communications technologies, data transmission between a terminal and a base station has become a focus of researches. In the prior art, terminals and base stations generally operate at a low frequency. For example, in a Long Term Evolution (LTE) technology, both terminals and base stations operate at a low frequency, that is, data is transmitted at a low frequency. During data communication, to assist a base station in improving transmission quality of low frequency downlink data, a terminal generally sends control information, for example, data retransmission request information, to the base station, and the base station responds to the data retransmission request and determines whether to perform data retransmission. In a manner of sending the control information, the terminal sends, at a low frequency to the base station, both the control information and data that needs to be transmitted.

For data transmission at a low frequency, a data rate is low, beam coverage is wide, and power consumption is low. For data transmission at a high frequency, a data rate is high, beam coverage is narrow, and power consumption is high. When a base station transmits data to a terminal, it is generally required that a higher data transmission rate is better. Therefore, it is put forward in the industry that a base station transmits data to a terminal at a high frequency when the base station transmits the data to the terminal, that is, the base station sends downlink data to the terminal at a high frequency. Because a data transmission rate at a high frequency is high, for an original method for sending control information by a terminal at a low frequency, a transmission time interval (TTI) is relatively long, that is, a feedback time is long. Therefore, the original method can no longer be applied to feed back control information that is used to improve transmission quality of high frequency downlink data. In addition, no method for feeding back control information in a timely manner is put forward in the industry in a process in which downlink data is transmitted at a high frequency.

SUMMARY

Embodiments of the present invention provide a transmission control method and an apparatus, so that a terminal can rapidly feed back control information at a high frequency in a process in which downlink data is transmitted at a high frequency, and a feedback time is short.

A first aspect of the present invention provides a transmission control method, including:
sending, by a base station, downlink data to a terminal at a high frequency when detecting that the downlink data needs to be transmitted at the high frequency; and
sending, by the terminal to the base station at the high frequency, control information used for assisting the base station in improving transmission quality of the high frequency downlink data, so that the base station controls a transmission process of the high frequency downlink data according to the control information.

A second aspect of the present invention provides a base station, including:
a sending module, configured to send downlink data to a terminal at a high frequency when detecting that the downlink data needs to be transmitted at the high frequency.

Based on the second aspect, in a first feasible implementation manner, the sending module is specifically configured to: when a downlink data transmission rate exceeds a preset threshold, determine that the downlink data needs to be transmitted at the high frequency, and send the downlink data to the terminal at the high frequency; or
the sending module is specifically configured to: when detecting that transmission of the downlink data at a low frequency is faulty, determine that the downlink data needs to be transmitted at the high frequency, and send the downlink data to the terminal at the high frequency.

A third aspect of the present invention provides a terminal, including:
a first sending module, configured to: when a base station sends downlink data to the terminal at a high frequency, send, to the base station at the high frequency, control information used for assisting the base station in improving transmission quality of the high frequency downlink data, so that the base station controls a transmission process of the high frequency downlink data according to the control information.

A fourth aspect of the present invention provides a base station, including a transmitter, where
the transmitter is configured to send downlink data to a terminal at a high frequency when detecting that the downlink data needs to be transmitted at the high frequency.

Based on the fourth aspect, in a first feasible implementation manner, the transmitter is further configured to: when a downlink data transmission rate exceeds a preset threshold, determine that the downlink data needs to be transmitted at the high frequency, and send the downlink data to the terminal at the high frequency; or
the transmitter is further configured to: when detecting that transmission of the downlink data at a low frequency is faulty, determine that the downlink data needs to be transmitted at the high frequency, and send the downlink data to the terminal at the high frequency.

A fifth aspect of the present invention provides a terminal, including a transmitter, where
the transmitter is configured to: when a base station sends downlink data to the terminal at a high frequency, send, to the base station at the high frequency, control information used for assisting the base station in improving transmission quality of the high frequency downlink data, so that the base station controls a transmission process of the high frequency downlink data according to the control information.

In the embodiments of the present invention, when detecting that downlink data needs to be transmitted at a high frequency, a base station sends the downlink data to a terminal at the high frequency, and the terminal sends, to the base station at the high frequency, control information used for assisting the base station in improving transmission quality of the high frequency downlink data, so that the base station controls a transmission process of the high frequency downlink data according to the control information. In the implementation manners, to improve the transmission quality of the high frequency downlink data, a manner of feeding back the control information at a high frequency is put forward. Because a time interval of the high frequency is relatively short, the control information can be rapidly fed back, suitable for data transmission of high frequency downlink data at a high rate, and reducing a feedback time of the control information.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A transmission control method provided in the embodiments of the present invention may be applied to a co-site network architecture of a high frequency and a low frequency. A base station includes a high frequency antenna and a low frequency antenna, and a terminal also includes a high frequency antenna and a low frequency antenna, that is, data transmission may be performed at both a high frequency and a low frequency between the base station and the terminal. The high frequency and low frequency are relative concepts herein. For example, E-band microwave and Long Term Evolution (LTE) technologies may be considered as specific embodiments of a high frequency and a low frequency, and scenarios in which two transmission frequencies are both high frequencies or low frequencies may also be considered as specific embodiments of a high frequency and a low frequency.

Compared with a low frequency signal, a high frequency signal herein has the following features: a higher data rate, narrower field of beam, a higher frequency, and larger power consumption of data transmission and exchange.

Compared with a high frequency signal, a low frequency signal has the following features: a lower data rate, wider field of beam, a lower frequency, and lower power consumption of data transmission and exchange.

When a frequency of a radio frequency (RF) antenna is relatively high, the antenna has a higher data rate. However, the field of beam of the antenna is narrower, and an antenna array needs to be used. If the high frequency is applied to uplink data transmission of a terminal, transmission quality is limited by many factors such as impact of a position of the terminal and high transmit power of the terminal. Therefore, a low frequency is generally applied to uplink data transmission of a terminal. When a frequency of an RF antenna is relatively high, the RF antenna may be applied to downlink data transmission of a base station, and have a higher data transmission rate. Therefore, both a high frequency and a low frequency may be applied to downlink data transmission of a base station. Regardless of whether downlink data is transmitted at a high frequency or at a low frequency, to ensure transmission quality, a terminal side needs to feed back some control information to a base station (BS) side to assist downlink data transmission. Relatively mature technical solutions have been developed to feed back control information in a process in which downlink data is transmitted at a low frequency. For example, in an LTE technical solution, a terminal supporting a signal frequency band operates at a low frequency, and transmits both control information and uplink data to a base station at a low frequency. For example, the second and the third subframes in an LTE TDD frame format may be used to transmit control information and uplink data.

With further development of communications technologies, it is gradually put forward in the industry that downlink data is transmitted at a high frequency. When downlink data is transmitted at a high frequency, a terminal needs to rapidly feed back control information by using low power. In the prior art, a low frequency is used to feed back control information. Because a transmission time interval (TTI) of a format of a frame transmitted at a low frequency is relatively long, that is, a feedback time is long, a low frequency is no longer suitable for feeding back control information when downlink data is transmitted at a high frequency. To reduce transmit power of a terminal, the terminal is not suitable for transmitting uplink data and control information simultaneously either. To resolve the problem, in the embodiments of the present invention, it is put forward that control information used for assisting in improving transmission quality of the high frequency downlink data is transmitted at a high frequency, and uplink data used for responding to the high frequency downlink data is transmitted at a low frequency, to ensure lower transmit power of a terminal, and ensure that the control information can be rapidly fed back.

Figure 1:
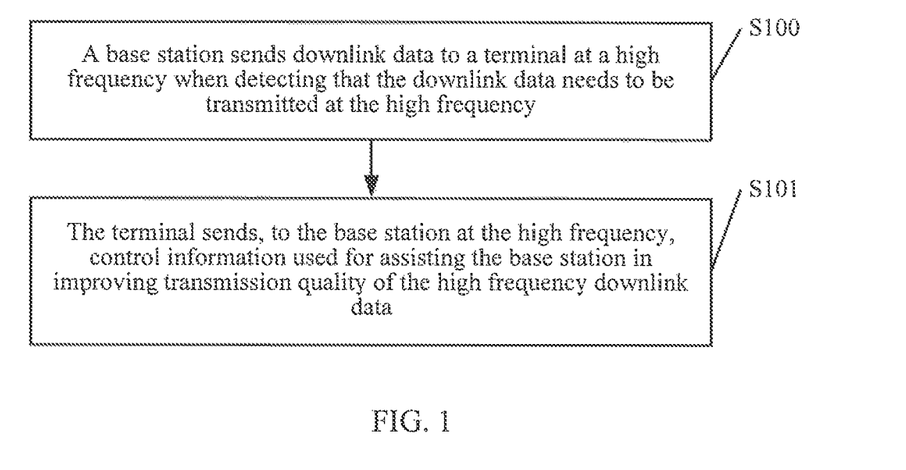
FIG. 1 is a schematic flowchart of a transmission control method according to an embodiment of the present invention.

Referring to FIG. 1, FIG. 1 is a schematic flowchart of a transmission control method according to an embodiment of the present invention. As shown in the figure, the transmission control method provided in this embodiment includes steps S100 and S101.

S100: A base station sends downlink data to a terminal at a high frequency when detecting that the downlink data needs to be transmitted at the high frequency.

In a specific embodiment, the method in this embodiment is applied to a co-site network architecture of a high frequency and a low frequency. The terminal includes a high frequency antenna and a low frequency antenna, and the base station includes a high frequency antenna and a low frequency antenna. When detecting that the downlink data needs to be transmitted at the high frequency, the base station sends the downlink data to the terminal at the high frequency. Optionally, the terminal establishes a high frequency link with the base station by using the high frequency antenna, and a downlink of the high frequency link is used to transmit high frequency downlink data between the base station and the terminal. The high frequency link may be a TDD high frequency channel, and the downlink of the high frequency link may be a downlink timeslot of the TDD high frequency channel. The TDD downlink timeslot of the high frequency channel transmits the downlink data from the base station to the terminal.

Optionally, detection manners of detecting that the downlink data needs to be transmitted at the high frequency may include the following two optional implementation manners.

In a first optional implementation manner, when a downlink data transmission rate exceeds a preset threshold, the base station determines that the downlink data needs to be transmitted at the high frequency, and sends the downlink data to the terminal at the high frequency.

In a specific embodiment, that the downlink data needs to be transmitted at the high frequency may be triggered by a trigger condition that the downlink data transmission rate is relatively high and exceeds the preset threshold. In this case, the base station may determine that the downlink data needs to be transmitted at the high frequency, and send the downlink data to the terminal at the high frequency.

In a second optional implementation manner, when detecting that transmission of the downlink data at a low frequency is faulty, the base station determines that the downlink data needs to be transmitted at the high frequency, and sends the downlink data to the terminal at the high frequency.

In a specific embodiment, that the downlink data needs to be transmitted at the high frequency may also be triggered by a trigger condition that transmission of the downlink data at a low frequency is faulty, for example, transmission is unstable when the downlink data is transmitted at a low frequency, or data is retransmitted many times when the downlink data is transmitted at a low frequency or the like. In this case, the base station may determine that the downlink data needs to be transmitted at the high frequency, and send the downlink data to the terminal at the high frequency.

S101: The terminal sends, to the base station at the high frequency, control information used for assisting the base station in improving transmission quality of the high frequency downlink data, so that the base station controls a transmission process of the high frequency downlink data according to the control information.

Figure 3:
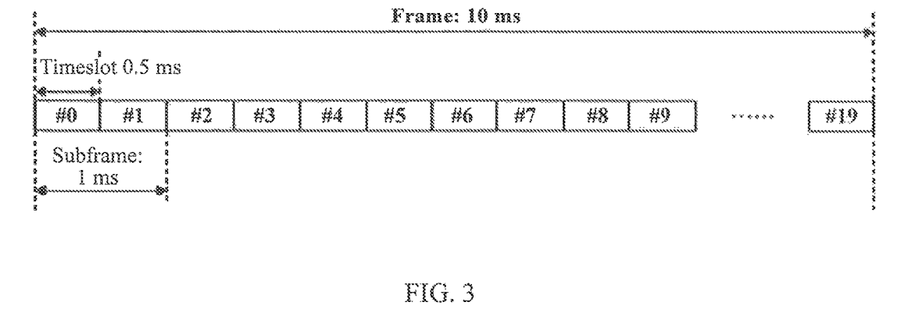
FIG. 3 shows an LTE FDD frame format according to an embodiment of the present invention.
Figure 4:
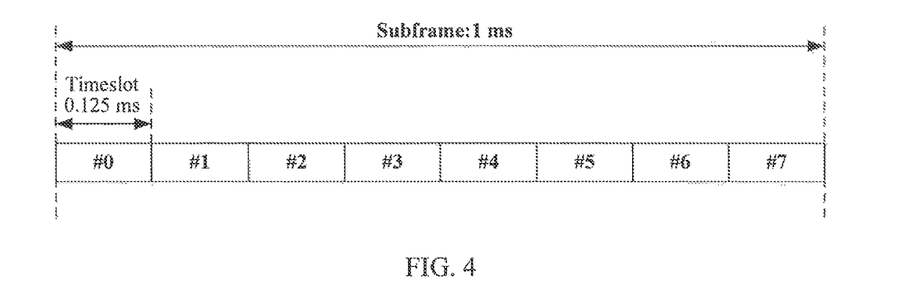
FIG. 4 shows a format of a frame transmitted at a high frequency according to an embodiment of the present invention.

In a specific embodiment, to ensure the transmission quality of the high frequency downlink data, the terminal needs to feed back, to the base station, the control information used for assisting the base station in improving transmission quality of the high frequency downlink data, so that the base station adjusts the transmission process of the high frequency downlink data according to the control information. A feedback time for feeding back the control information mainly depends on a TTI timeslot length in a format of a transmitted frame. A TTI timeslot length of the low frequency is different from that of the high frequency. As shown in FIG. 3, FIG. 3 shows an LTE frequency division duplex (FDD) frame format. It is learned from the figure that a length of one subframe in the FDD frame format defined in LTE is 1 ms, and is one TTI timeslot length in LTE. As shown in FIG. 4, FIG. 4 shows a typical format of a frame transmitted at a high frequency. One timeslot length obtained by division in the format of a high frequency frame is 0.125 ms, and is one TTI timeslot length. It may be learned that, as the RF frequency is higher, the TTI timeslot length is shorter, and on the contrary, as the RF frequency is lower, the TTI timeslot length is longer.

Because a transmission rate is high when the downlink data is transmitted at the high frequency, the control information needs to be rapidly fed back, so that the transmission process of the high frequency downlink data can be adjusted and controlled in a timely manner. Therefore, this embodiment of the present invention provides a solution in which the control information used for assisting the base station in improving transmission quality of the high frequency downlink data is sent to the base station at the high frequency. Optionally, when the control information is sent at the high frequency, the control information may be transmitted by means of an uplink timeslot on a high frequency channel. The uplink timeslot on the high frequency channel may be referred to as a control channel, and the control information used for assisting the base station in improving transmission quality of the high frequency downlink data is transmitted on the control channel.

Figure 5:
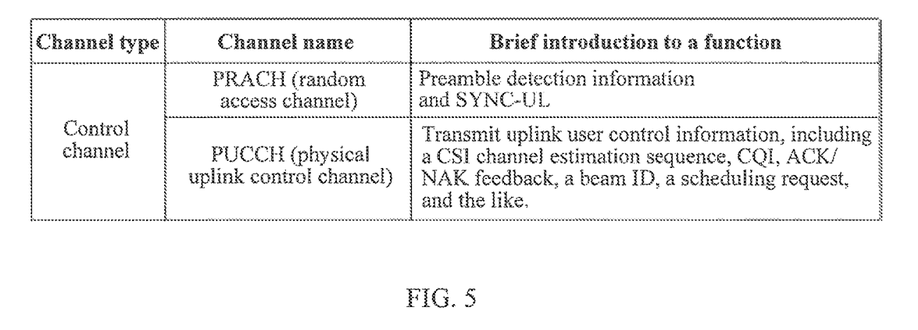
FIG. 5 shows a table including a detailed description of a control channel according to an embodiment of the present invention.

Furthermore, the control information may include synchronization control information and user control information. As shown in FIG. 5, the synchronization control information is transmitted on a physical random access channel (PRACH) of the control channel. The synchronization control information may include Preamble detection information and an uplink synchronization code SYNC-UL. The user control information is transmitted on a physical uplink control channel (PUCCH). The user control information may include a channel estimation sequence of channel state information (CSI), a channel quality indicator (CQI), an acknowledgement (ACK) or a negative acknowledgement (NACK), a beam ID, a scheduling request, and the like. It should be noted that control information that is actually fed back may also be one or more of the foregoing control information.

The base station responds to the different control information in different manners. For example, when the BS side responds to the ACK/NACK indication, the BS side provides a response and implements data retransmission if the NACK is valid. Otherwise, the BS side does not perform data retransmission. Alternatively, by using channel reciprocity in TDD, the terminal sends the channel estimation sequence at a high frequency. The BS side performs channel estimation by using the channel estimation sequence, and transmits the downlink data at the high frequency by directly using a result of the channel estimation.

The above describes a procedure in which only the control information is transmitted in an uplink timeslot of the TDD high frequency channel. If there are N (N is greater than or equal to 2) high frequency channels that have different frequencies and whose synchronization has been implemented, in the technical solution in the present invention, the control information can be fed back on an FDD high frequency channel. Because there is no channel reciprocity in FDD, it is unnecessary to transmit the channel estimation sequence of the CSI in the control information fed back on an FDD uplink, and instead, the terminal needs to feed back an estimation result of a downlink timeslot on the high frequency channel.

Optionally, a manner of sending, by the terminal, the control information to the base station at the high frequency may include steps S10 to S13.

S10: The terminal generates a control signal according to the high frequency downlink data, where the control signal includes the control information used for assisting the base station in improving transmission quality of the high frequency downlink data.

S11: The terminal modulates the control signal by using a lower order modulation mode to obtain a modulated signal including the control information.

In a specific embodiment, to reduce transmit power of the terminal and implement low signal-to-noise ratio communication, the terminal modulates the control signal including the control information by using the low-frequency modulation mode.

Optionally, the low-frequency modulation mode may be that the terminal modulates the control signal by using a single carrier or multiple carriers to obtain the modulated signal including the control information.

S12: The terminal processes, based on a spread spectrum communications technology, the modulated signal to obtain a sending signal including the control information.

S13: The terminal sends, to the base station at the high frequency, the sending signal including the control information.

In the embodiments of the present invention, when detecting that downlink data needs to be transmitted at a high frequency, a base station sends the downlink data to a terminal at the high frequency, and the terminal sends, to the base station at the high frequency, control information used for assisting the base station in improving transmission quality of the high frequency downlink data, so that the base station controls a transmission process of the high frequency downlink data according to the control information. In this implementation manner, to improve the transmission quality of the high frequency downlink data, a manner of feeding back the control information at a high frequency is put forward. Because a time interval of the high frequency is relatively short, the control information can be rapidly fed back, suitable for data transmission of high frequency downlink data at a high rate, and reducing a feedback time of the control information.

Figure 2:
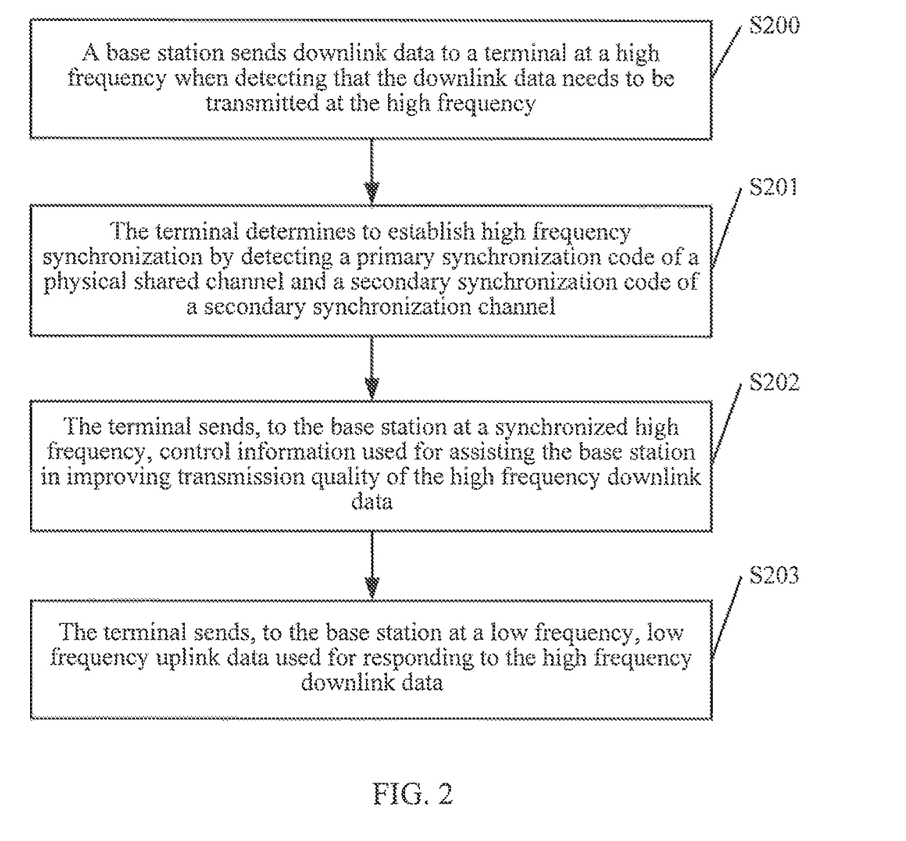
FIG. 2 is a schematic flowchart of another transmission control method according to an embodiment of the present invention.

Referring to FIG. 2, FIG. 2 is a schematic flowchart of another transmission control method according to an embodiment of the present invention. As shown in the figure, the transmission control method provided in this embodiment includes steps S200 to S203.

S200: A base station sends downlink data to a terminal at a high frequency when detecting that the downlink data needs to be transmitted at the high frequency.

For details of step S200 in this embodiment of the present invention, refer to step S100 in the embodiment of FIG. 1. Details are not described herein again.

S201: The terminal determines to establish high frequency synchronization by detecting a primary synchronization code of a physical shared channel and a secondary synchronization code of a secondary synchronization channel.

In a specific embodiment, before transmitting control information at a high frequency, the terminal needs to determine to establish high frequency synchronization by detecting the primary synchronization code (PSC) of the physical shared channel (PSCH) and a secondary synchronization code (SSC) of the secondary synchronization channel (SSCH).

S202: The terminal sends, to the base station at a synchronized high frequency, control information used for assisting the base station in improving transmission quality of the high frequency downlink data.

S203: The terminal sends, to the base station at a low frequency, low frequency uplink data used for responding to the high frequency downlink data.

In a specific embodiment, when a terminal interacts with a base station, the base station may send data to the terminal at a low frequency or at a high frequency. The terminal sends, to the base station at a high frequency, control information used for improving transmission quality of the high frequency downlink data. To reduce transmit power of the terminal, during data communication between the terminal and the base station, the terminal sends, to the base station at a low frequency, low frequency uplink data used for responding to the high frequency downlink data. That is, the terminal sends only the control information at a high frequency, and all uplink data used for responding to the high frequency downlink data is sent at a low frequency, to achieve low transmit power of the terminal.

In the embodiments of the present invention, when detecting that downlink data needs to be transmitted at a high frequency, a base station sends the downlink data to a terminal at the high frequency, and the terminal sends, to the base station at the high frequency, control information used for assisting the base station in improving transmission quality of the high frequency downlink data, so that the base station controls a transmission process of the high frequency downlink data according to the control information. In this implementation manner, to improve the transmission quality of the high frequency downlink data, a manner of feeding back the control information at a high frequency is put forward. Because a time interval of the high frequency is relatively short, the control information can be rapidly fed back, suitable for data transmission of high frequency downlink data at a high rate, and reducing a feedback time of the control information.

Figure 6:
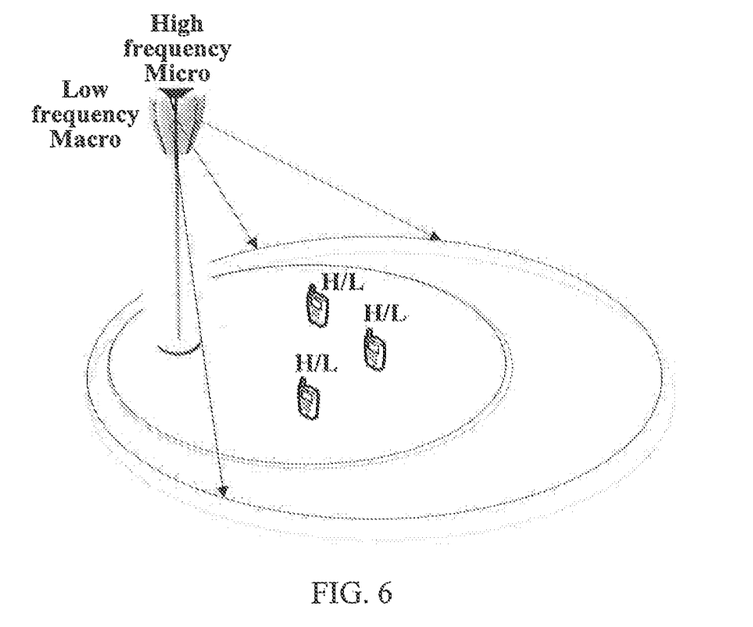
FIG. 6 is a diagram of a co-site network architecture of a high frequency and a low frequency according to an embodiment of the present invention.

Referring to FIG. 6, FIG. 6 shows a co-site network architecture of a high frequency and a low frequency according to an embodiment of the present invention. The method in the foregoing embodiment can be applied to the network architecture. As shown in the figure, the network architecture includes a terminal and a base station. The terminal includes a high frequency antenna and a low frequency antenna, and the base station also includes a high frequency antenna and a low frequency antenna. Both high frequency data transmission and low frequency data transmission can be performed between the base station and the terminal. In an actual application, the base station may send downlink data to the terminal at a low frequency or at a high frequency.

Regardless of whether downlink data is transmitted at a high frequency or at a low frequency, to ensure the transmission quality, the terminal side needs to feed back some control information to the BS side to assist downlink data transmission. Relatively mature technical solutions have been developed to feed back control information used for assisting in improving transmission quality of the low frequency downlink data during transmission of the low frequency downlink data. For example, in an LTE technical solution, a terminal supporting a signal frequency band operates at a low frequency, and transmits both control information and uplink data at a low frequency. For example, the second and the third subframes in an LTE TDD frame format are used to transmit control information and uplink data.

The terminal needs to rapidly feed back, by using low power, control information used for assisting in improving transmission quality of the high frequency downlink data. In the prior art, a low frequency is used to feed back control information. Because a transmission time interval (TTI) of a format of a frame transmitted at a low frequency is relatively long, that is, a feedback time is long, the low frequency is no longer suitable for feeding back control information when downlink data is transmitted at a high frequency. To reduce transmit power of a terminal, a high frequency is not suitable for transmitting uplink data used for responding to downlink data and control information simultaneously either. To resolve the problem, in the embodiments of the present invention, it is put forward that only control information used for assisting in improving transmission quality of the high frequency downlink data is transmitted at a high frequency, and uplink data used for responding to the high frequency downlink data is transmitted at a low frequency, to ensure lower transmit power of a terminal, and ensure that the control information can be rapidly fed back.

In the embodiments of the present invention, when detecting that downlink data needs to be transmitted at a high frequency, a base station sends the downlink data to a terminal at the high frequency, and the terminal sends, to the base station at the high frequency, control information used for assisting the base station in improving transmission quality of the high frequency downlink data, so that the base station controls a transmission process of the high frequency downlink data according to the control information. In this implementation manner, to improve the transmission quality of the high frequency downlink data, a manner of feeding back the control information at a high frequency is put forward. Because a time interval of the high frequency is relatively short, the control information can be rapidly fed back, suitable for data transmission of high frequency downlink data at a high rate, and reducing a feedback time of the control information.

Figure 7:
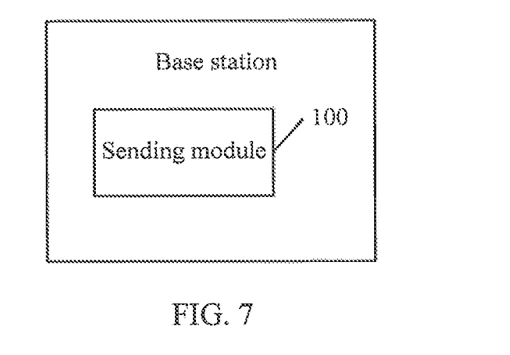
FIG. 7 is a schematic structural diagram of a base station according to an embodiment of the present invention.

Referring to FIG. 7, FIG. 7 is a schematic structural diagram of a base station according to an embodiment of the present invention. As shown in the figure, the base station in this embodiment may include a sending module 100. The following describes the base station provided in this embodiment in detail.

The sending module 100 is configured to send downlink data to a terminal at a high frequency when detecting that the downlink data needs to be transmitted at the high frequency.

Specifically, the sending module 100 is specifically configured to: when a downlink data transmission rate exceeds a preset threshold, determine that the downlink data needs to be transmitted at the high frequency, and send the downlink data to the terminal at the high frequency; or the sending module is specifically configured to: when detecting that transmission of the downlink data at a low frequency is faulty, determine that the downlink data needs to be transmitted at the high frequency, and send the downlink data to the terminal at the high frequency.

In a specific embodiment, that the downlink data needs to be transmitted at the high frequency may be triggered by a trigger condition that the downlink data transmission rate is relatively high and exceeds the preset threshold. A rate at which the downlink data is transmitted at a low frequency cannot satisfy the relatively high downlink data transmission rate. In this case, the sending module 100 may determine that the downlink data needs to be transmitted at the high frequency, and send the downlink data to the terminal at the high frequency.

That the downlink data needs to be transmitted at the high frequency may also be triggered by a trigger condition that transmission of the downlink data at a low frequency is faulty, for example, transmission is unstable when the downlink data is transmitted at a low frequency, or data is retransmitted many times when the downlink data is transmitted at a low frequency or the like. In this case, the sending module 100 may determine that the downlink data needs to be transmitted at the high frequency, and the sending module 100 in the base station sends the downlink data to the terminal at the high frequency.

In the embodiments of the present invention, when detecting that downlink data needs to be transmitted at a high frequency, a base station sends the downlink data to a terminal at the high frequency, and the terminal sends, to the base station at the high frequency, control information used for assisting the base station in improving transmission quality of the high frequency downlink data, so that the base station controls a transmission process of the high frequency downlink data according to the control information. In this implementation manner, to improve the transmission quality of the high frequency downlink data, a manner of feeding back the control information at a high frequency is put forward. Because a time interval of the high frequency is relatively short, the control information can be rapidly fed back, suitable for data transmission of high frequency downlink data at a high rate, and reducing a feedback time of the control information.

Figure 8:
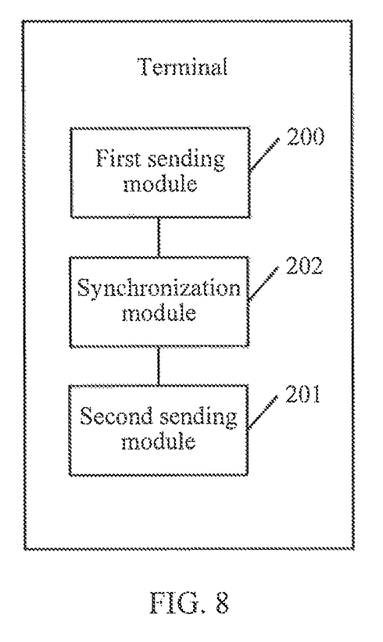
FIG. 8 is a schematic structural diagram of a terminal according to an embodiment of the present invention.

Referring to FIG. 8, FIG. 8 is a schematic structural diagram of a terminal according to an embodiment of the present invention. As shown in the figure, the terminal in this embodiment may include a first sending module 200. The following describes the terminal provided in this embodiment in detail.

The first sending module 200 is configured to: when a base station sends downlink data to the terminal at a high frequency, send, to the base station at the high frequency, control information used for assisting the base station in improving transmission quality of the high frequency downlink data, so that the base station controls a transmission process of the high frequency downlink data according to the control information.

In a specific embodiment, to ensure the transmission quality of the high frequency downlink data, the first sending module 200 in the terminal needs to feed back, to the base station, the control information used for assisting the base station in improving transmission quality of the high frequency downlink data, so that the base station adjusts the transmission process of the high frequency downlink data according to the control information. A feedback time for feeding back the control information mainly depends on a TTI timeslot length in a format of a transmitted frame. A TTI timeslot length of the low frequency is different from that of the high frequency. As shown in FIG. 3, FIG. 3 shows an LTE frequency division duplex (FDD) frame format. It is learned from the figure that a length of one subframe in the FDD frame format defined in LTE is 1 ms, and is one TTI timeslot length in LTE. As shown in FIG. 4, FIG. 4 shows a typical format of a frame transmitted at a high frequency. One timeslot length obtained by division in the format of a high frequency frame is 0.125 ms, and is one TTI timeslot length. It may be learned that, as the RF frequency is higher, the TTI timeslot length is shorter, and on the contrary, as the RF frequency is lower, the TTI timeslot length is longer.

Because a transmission rate is high when the downlink data is transmitted at the high frequency, the control information needs to be rapidly fed back, so that the transmission process of the high frequency downlink data can be adjusted and controlled in a timely manner. Therefore, this embodiment of the present invention provides a solution in which the control information used for assisting the base station in improving transmission quality of the high frequency downlink data is sent to the base station at the high frequency. Optionally, when the control information is sent at the high frequency, the control information may be transmitted by means of an uplink timeslot on a high frequency channel. The uplink timeslot on the high frequency channel may be referred to as a control channel, and the control information used for assisting the base station in improving transmission quality of the high frequency downlink data is transmitted on the control channel.

Furthermore, the control information may include synchronization control information and user control information. As shown in FIG. 5, the synchronization control information is transmitted on a physical random access channel (PRACH) of the control channel. The synchronization control information may include Preamble detection information and an uplink synchronization code SYNC-UL. The user control information is transmitted on a physical uplink control channel (PUCCH). The user control information may include a channel estimation sequence of channel state information (CSI), a channel quality indicator (CQI), an acknowledgement (ACK) or a negative acknowledgement (NACK), a beam ID, a scheduling request, and the like. It should be noted that control information that is actually fed back may also be one or more of the foregoing control information.

The base station responds to the different control information in different manners. For example, when the BS side responds to the ACK/NACK indication, the BS side provides a response and implements data retransmission if the NACK is valid. Otherwise, the BS side does not perform data retransmission. Alternatively, by using channel reciprocity in TDD, the terminal sends the channel estimation sequence at a high frequency. The BS side performs channel estimation by using the channel estimation sequence, and transmits the downlink data at the high frequency by directly using a result of the channel estimation.

The above describes a procedure in which only the control information is transmitted in an uplink timeslot of the TDD high frequency channel. If there are N (N is greater than or equal to 2) high frequency channels that have different frequencies and whose synchronization has been implemented, in the technical solution in the present invention, the control information can be fed back on an FDD high frequency channel. Because there is no channel reciprocity in FDD, it is unnecessary to transmit the channel estimation sequence of the CSI in the control information fed back on an FDD uplink, and instead, the terminal needs to feed back an estimation result of a downlink timeslot on the high frequency channel.

Further optionally, the first sending module 200 may include a generation unit, a modulation unit, a processing unit, and a sending unit, where the generation unit is configured to generate a control signal according to the high frequency downlink data, where the control signal includes the control information used for assisting the base station in improving transmission quality of the high frequency downlink data;

the modulation unit is configured to modulate the control signal by using a lower order modulation mode to obtain a modulated signal including the control information;

the modulation unit is specifically configured to modulate the control signal by using a single carrier or multiple carriers to obtain the modulated signal including the control information;

the processing unit is configured to process, based on a spread spectrum communications technology, the modulated signal to obtain a sending signal including the control information; and the sending unit is configured to send, to the base station at the high frequency, the sending signal including the control information.

Optionally, the terminal may further include a second sending module 201, where the second sending module 201 is configured to send, to the base station at a low frequency, low frequency uplink data used for responding to the high frequency downlink data.

In a specific embodiment, during interaction between the terminal and the base station, the base station may send data to the terminal at a low frequency or at a high frequency. The terminal sends, to the base station at a high frequency, control information used for improving transmission quality of the high frequency downlink data. To reduce transmit power of the terminal, during data communication between the terminal and the base station, the second sending module 201 in the terminal sends, to the base station at a low frequency, low frequency uplink data used for responding to the high frequency downlink data. That is, the terminal sends only the control information at a high frequency, and all uplink data used for responding to the high frequency downlink data is sent at a low frequency, to achieve low transmit power of the terminal.

Optionally, the terminal further includes a synchronization module 202, where the synchronization module 202 is configured to determine to establish high frequency synchronization by detecting a primary synchronization code of a physical shared channel and a secondary synchronization code of a secondary synchronization channel; and In a specific embodiment, before transmitting control information at a high frequency, the synchronization module 202 in the terminal needs to determine to establish high frequency synchronization by detecting the primary synchronization code (PSC) of the physical shared channel (PSCH) and a secondary synchronization code (SSC) of the secondary synchronization channel (SSCH).

The first sending module 200 is specifically configured to send, to the base station at a synchronized high frequency, the control information used for assisting the base station in improving transmission quality of the high frequency downlink data.

In the embodiments of the present invention, when detecting that downlink data needs to be transmitted at a high frequency, a base station sends the downlink data to a terminal at the high frequency, and the terminal sends, to the base station at the high frequency, control information used for assisting the base station in improving transmission quality of the high frequency downlink data, so that the base station controls a transmission process of the high frequency downlink data according to the control information. In this implementation manner, to improve the transmission quality of the high frequency downlink data, a manner of feeding back the control information at a high frequency is put forward. Because a time interval of the high frequency is relatively short, the control information can be rapidly fed back, suitable for data transmission of high frequency downlink data at a high rate, and reducing a feedback time of the control information.

Figure 9:
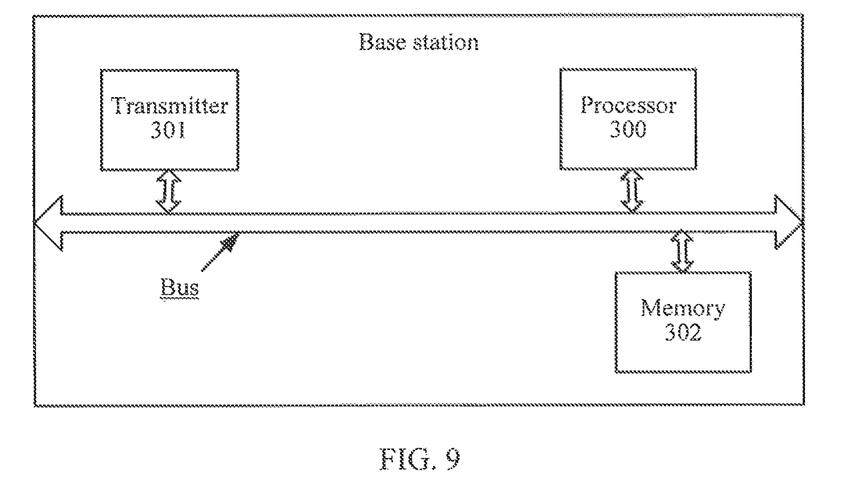
FIG. 9 is a schematic structural diagram of another base station according to an embodiment of the present invention.

Referring to FIG. 9, FIG. 9 is a schematic structural diagram of another base station according to an embodiment of the present invention. As shown in the figure, the base station in this embodiment includes a processor 300, a transmitter 301, and a memory 302. The memory 302 is configured to store program code; the processor 300 is configured to call the program code in the memory 302 to execute a corresponding operation; and the processor 300, the transmitter 301, and the memory 302 are connected to a bus, and communicate with each other by means of the bus.

The transmitter is configured to send downlink data to a terminal at a high frequency when detecting that the downlink data needs to be transmitted at the high frequency.

Optionally, the method in this embodiment is applied to a co-site network architecture of a high frequency and a low frequency. The terminal includes a high frequency antenna and a low frequency antenna, and the base station includes a high frequency antenna and a low frequency antenna. When detecting that the downlink data needs to be transmitted at the high frequency, the base station sends the downlink data to the terminal at the high frequency. Optionally, the terminal establishes a high frequency link with the base station by using the high frequency antenna, and a downlink of the high frequency link is used to transmit high frequency downlink data between the base station and the terminal. The high frequency link may be a TDD high frequency channel, and the downlink of the high frequency link may be a downlink timeslot of the TDD high frequency channel. The TDD downlink timeslot of the high frequency channel transmits the downlink data from the base station to the terminal.

The transmitter is further configured to: when a downlink data transmission rate exceeds a preset threshold, determine that the downlink data needs to be transmitted at the high frequency, and send the downlink data to the terminal at the high frequency; or the transmitter is further configured to: when detecting that transmission of the downlink data at a low frequency is faulty, determine that the downlink data needs to be transmitted at the high frequency, and send the downlink data to the terminal at the high frequency.

Optionally, that the downlink data needs to be transmitted at the high frequency may be triggered by a trigger condition that the downlink data transmission rate is relatively high and exceeds the preset threshold. In this case, the base station may determine that the downlink data needs to be transmitted at the high frequency, and send the downlink data to the terminal at the high frequency.

Optionally, that the downlink data needs to be transmitted at the high frequency may also be triggered by a trigger condition that transmission of the downlink data at a low frequency is faulty, for example, transmission is unstable when the downlink data is transmitted at a low frequency, or data is retransmitted many times when the downlink data is transmitted at a low frequency or the like. In this case, the base station may determine that the downlink data needs to be transmitted at the high frequency, and send the downlink data to the terminal at the high frequency.

In the embodiments of the present invention, when detecting that downlink data needs to be transmitted at a high frequency, a base station sends the downlink data to a terminal at the high frequency, and the terminal sends, to the base station at the high frequency, control information used for assisting the base station in improving transmission quality of the high frequency downlink data, so that the base station controls a transmission process of the high frequency downlink data according to the control information. In this implementation manner, to improve the transmission quality of the high frequency downlink data, a manner of feeding back the control information at a high frequency is put forward. Because a time interval of the high frequency is relatively short, the control information can be rapidly fed back, suitable for data transmission of high frequency downlink data at a high rate, and reducing a feedback time of the control information.

Figure 10:
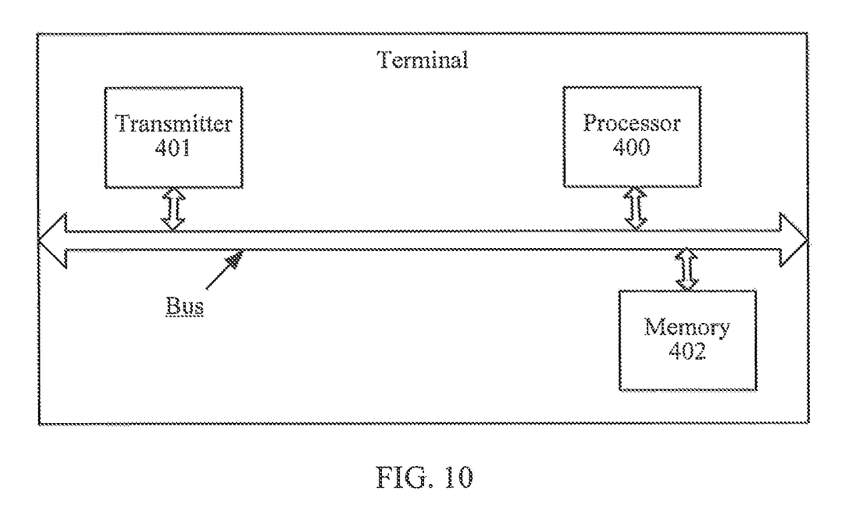
FIG. 10 is a schematic structural diagram of another terminal according to an embodiment of the present invention.

Referring to FIG. 10, FIG. 10 is a schematic structural diagram of another terminal according to an embodiment of the present invention. As shown in the figure, the terminal in this embodiment includes a processor 400, a transmitter 401, and a memory 402. The memory 402 is configured to store program code; the processor 400 is configured to call the program code in the memory 402 to execute a corresponding operation; and the processor 400, the transmitter 401, and the memory 402 are connected to a bus, and communicate with each other by means of the bus.

The transmitter is configured to: when a base station sends downlink data to the terminal at a high frequency, send, to the base station at the high frequency, control information used for assisting the base station in improving transmission quality of the high frequency downlink data, so that the base station controls a transmission process of the high frequency downlink data according to the control information.

Optionally, to ensure the transmission quality of the high frequency downlink data, the terminal needs to feed back, to the base station, the control information used for assisting the base station in improving transmission quality of the high frequency downlink data, so that the base station adjusts the transmission process of the high frequency downlink data according to the control information. A feedback time for feeding back the control information mainly depends on a TTI timeslot length in a format of a transmitted frame. A TTI timeslot length of the low frequency is different from that of the high frequency. As shown in FIG. 3, FIG. 3 shows an LTE frequency division duplex (FDD) frame format. It is learned from the figure that a length of one subframe in the FDD frame format defined in LTE is 1 ms, and is one TTI timeslot length in LTE. As shown in FIG. 4, FIG. 4 shows a typical format of a frame transmitted at a high frequency. One timeslot length obtained by division in the format of a high frequency frame is 0.125 ms, and is one TTI timeslot length. It may be learned that, as the RF frequency is higher, the TTI timeslot length is shorter, and on the contrary, as the RF frequency is lower, the TTI timeslot length is longer.

Because a transmission rate is high when the downlink data is transmitted at the high frequency, the control information needs to be rapidly fed back, so that the transmission process of the high frequency downlink data can be adjusted and controlled in a timely manner. Therefore, this embodiment of the present invention provides a solution in which the control information used for assisting the base station in improving transmission quality of the high frequency downlink data is sent to the base station at the high frequency. Optionally, when the control information is sent at the high frequency, the control information may be transmitted by means of an uplink timeslot on a high frequency channel. The uplink timeslot on the high frequency channel may be referred to as a control channel, and the control information used for assisting the base station in improving transmission quality of the high frequency downlink data is transmitted on the control channel.

Furthermore, the control information may include synchronization control information and user control information. As shown in FIG. 5, the synchronization control information is transmitted on a physical random access channel (PRACH) of the control channel. The synchronization control information may include Preamble detection information and an uplink synchronization code SYNC-UL. The user control information is transmitted on a physical uplink control channel (PUCCH). The user control information may include a channel estimation sequence of channel state information (CSI), a channel quality indicator (CQI), an acknowledgement (ACK) or a negative acknowledgement (NACK), a beam ID, a scheduling request, and the like. It should be noted that control information that is actually fed back may also be one or more of the foregoing control information.

The base station responds to the different control information in different manners. For example, when the BS side responds to the ACK/NACK indication, the BS side provides a response and implements data retransmission if the NACK is valid. Otherwise, the BS side does not perform data retransmission. Alternatively, by using channel reciprocity in TDD, the terminal sends the channel estimation sequence at a high frequency. The BS side performs channel estimation by using the channel estimation sequence, and transmits the downlink data at the high frequency by directly using a result of the channel estimation.

The above describes a procedure in which only the control information is transmitted in an uplink timeslot of the TDD high frequency channel. If there are N (N is greater than or equal to 2) high frequency channels that have different frequencies and whose synchronization has been implemented, in the technical solution in the present invention, the control information can be fed back on an FDD high frequency channel. Because there is no channel reciprocity in FDD, it is unnecessary to transmit the channel estimation sequence of the CSI in the control information fed back on an FDD uplink, and instead, the terminal needs to feed back an estimation result of a downlink timeslot on the high frequency channel.

The transmitter is further configured to send, to the base station at a low frequency, low frequency uplink data used for responding to the high frequency downlink data.

Optionally, during interaction between the terminal and the base station, the base station may send data to the terminal at a low frequency or at a high frequency. The terminal sends, to the base station at a high frequency, control information used for improving transmission quality of the high frequency downlink data. To reduce transmit power of the terminal, during data communication between the terminal and the base station, the terminal sends, to the base station at a low frequency, low frequency uplink data used for responding to the high frequency downlink data. That is, the terminal sends only the control information at a high frequency, and all uplink data used for responding to the high frequency downlink data is sent at a low frequency, to achieve low transmit power of the terminal.

The processor is further configured to generate a control signal according to the high frequency downlink data, where the control signal includes the control information used for assisting the base station in improving transmission quality of the high frequency downlink data.

The processor is further configured to modulate the control signal by using a lower order modulation mode to obtain a modulated signal including the control information.

The processor is further configured to process, based on a spread spectrum communications technology, the modulated signal to obtain a sending signal including the control information.

The transmitter is further configured to send, to the base station at the high frequency, the sending signal including the control information.

Optionally, to reduce transmit power of the terminal and implement low signal-to-noise ratio communication, the terminal modulates the control signal including the control information by using the low-frequency modulation mode.

The processor is further configured to modulate the control signal by using a single carrier or multiple carriers to obtain the modulated signal including the control information.

The processor is further configured to determine to establish high frequency synchronization by detecting a primary synchronization code of a physical shared channel and a secondary synchronization code of a secondary synchronization channel.

The transmitter is further configured to send, to the base station at a synchronized high frequency, the control information used for assisting the base station in improving transmission quality of the high frequency downlink data.

Optionally, before transmitting control information on an uplink of a high frequency link, the terminal needs to determine to establish high frequency synchronization by detecting the primary synchronization code (PSC) of the physical shared channel (PSCH) and a secondary synchronization code (SSC) of the secondary synchronization channel (SSCH).

In the embodiments of the present invention, when detecting that downlink data needs to be transmitted at a high frequency, a base station sends the downlink data to a terminal at the high frequency, and the terminal sends, to the base station at the high frequency, control information used for assisting the base station in improving transmission quality of the high frequency downlink data, so that the base station controls a transmission process of the high frequency downlink data according to the control information. In this implementation manner, to improve the transmission quality of the high frequency downlink data, a manner of feeding back the control information at a high frequency is put forward. Because a time interval of the high frequency is relatively short, the control information can be rapidly fed back, suitable for data transmission of high frequency downlink data at a high rate, and reducing a feedback time of the control information.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

Only examples of the embodiments of the present invention are disclosed above, and certainly are not intended to limit the protection scope of the present invention. Therefore, equivalent variations made in accordance with the claims of the present invention shall fall within the scope of the present invention.

What is claimed is:

1. A transmission control method, comprising:
   receiving, by a terminal, downlink data from a base station at a high frequency;
   generating, by the terminal, a control signal according to the downlink data, wherein the control signal comprises control information for assisting the base station in improving transmission quality of the high frequency downlink data;
   modulating, by the terminal, the control signal by using a lower order modulation mode to obtain a modulated signal comprising the control information;
   processing, by the terminal, based on a spread spectrum communications technology, the modulated signal to obtain a sending signal comprising the control information; and
   sending, by the terminal, to the base station at the high frequency, the sending signal comprising the control information.

2. The method according to claim 1, wherein receiving the downlink data from the base station at the high frequency is based on
   a downlink data transmission rate exceeding a preset threshold or
   transmission of downlink data at a low frequency being faulty.

3. The method according to claim 1, wherein the method further comprises:
   sending, by the terminal, to the base station at a low frequency, low frequency uplink data for responding to the downlink data.

4. The method according to claim 1, wherein modulating the control signal by using the lower order modulation mode to obtain the modulated signal comprising the control information comprises:
   modulating, by the terminal, the control signal by using a single carrier or multiple carriers to obtain the modulated signal comprising the control information.

5. The method according to claim 1, wherein before sending the sending signal to the base station at the high frequency, the method further comprises:
   determining, by the terminal, to establish high frequency synchronization by detecting a primary synchronization code of a physical shared channel and a secondary synchronization code of a secondary synchronization channel; and
   wherein the sending signal is sent at a synchronized high frequency.

6. A base station, comprising a processor and a non-transitory computer-readable medium having processor-executable instructions stored thereon, wherein the processor-executable instructions, when executed by the processor, facilitate:
   transmitting downlink data to a terminal at a high frequency;
   receiving a sending signal from the terminal, wherein the sending signal is based on the downlink data and comprises control information, wherein the control information is for assisting the base station in improving transmission quality of high frequency downlink data to the terminal;
   processing, based on a spread spectrum communications technology, the sending signal to obtain a modulated signal comprising the control information;
   demodulating the modulated signal by using a lower order modulation mode to obtain a control signal comprising the control information; and
   controlling a transmission process for transmission of high frequency downlink data to the terminal according to the control information.

7. A terminal, comprising a processor and a non-transitory computer-readable medium having processor-executable instructions stored thereon, wherein the processor-executable instructions, when executed by the processor, facilitate:
   receiving downlink data from a base station at a high frequency;
   generating a control signal according to the downlink data, wherein the control signal comprises control information for assisting the base station in improving transmission quality of high frequency downlink data;
   modulating the control signal by using a lower order modulation mode to obtain a modulated signal comprising the control information;
   processing, based on a spread spectrum communications technology, the modulated signal to obtain a sending signal comprising the control information; and
   sending, to the base station at the high frequency, the sending signal comprising the control information.

8. The terminal according to claim 7, wherein receiving the downlink data from the base station at the high frequency is based on a downlink data transmission rate exceeding a preset threshold or transmission of downlink data at a low frequency being faulty.

9. The terminal according to claim 7, wherein the processor-executable instructions, when executed, further facilitate:
   sending, to the base station at a low frequency, low frequency uplink data for responding to the downlink data.

10. The terminal according to claim 7, wherein modulating the control signal by using the lower order modulation mode to obtain the modulated signal comprising the control information comprises:
    modulating the control signal by using a single carrier or multiple carriers to obtain the modulated signal comprising the control information.

11. The terminal according to claim 7, wherein the processor-executable instructions, when executed, further facilitate:
    before sending the sending signal to the base station at the high frequency, determining to establish high frequency synchronization by detecting a primary synchronization code of a physical shared channel and a secondary synchronization code of a secondary synchronization channel; and
    wherein the sending signal is sent at a synchronized high frequency.

12. A transmission control method, comprising:
    transmitting, by a base station, downlink data to a terminal at a high frequency;
    receiving, by the base station, a sending signal from the terminal, wherein the sending signal is based on the downlink data and comprises control information, wherein the control information is for assisting the base station in improving transmission quality of high frequency downlink data to the terminal;
    processing, by the base station, based on a spread spectrum communications technology, the sending signal to obtain a modulated signal comprising the control information;
    demodulating, by the base station, the modulated signal by using a lower order modulation mode to obtain a control signal comprising the control information; and controlling, by the base station, a transmission process for transmission of high frequency downlink data to the terminal according to the control information.

13. A non-transitory computer-readable medium having processor-executable instructions stored thereon, wherein the processor-executable instructions, when executed, facilitate:
receiving downlink data from a base station at a high frequency;
generating a control signal according to the downlink data, wherein the control signal comprises control information for assisting the base station in improving transmission quality of high frequency downlink data;
modulating the control signal by using a lower order modulation mode to obtain a modulated signal comprising the control information;
processing, based on a spread spectrum communications technology, the modulated signal to obtain a sending signal comprising the control information; and
sending, to the base station at the high frequency, the sending signal comprising the control information.

14. The non-transitory computer-readable medium according to claim 13, wherein receiving the downlink data from the base station at the high frequency is based on a downlink data transmission rate exceeding a preset threshold or transmission of downlink data at a low frequency being faulty.

15. The non-transitory computer-readable medium according to claim 13, wherein the processor-executable instructions, when executed, further facilitate:
sending, to the base station at a low frequency, low frequency uplink data for responding to the downlink data.

16. The non-transitory computer-readable medium according to claim 13, wherein modulating the control signal by using the lower order modulation mode to obtain the modulated signal comprising the control information comprises:
modulating the control signal by using a single carrier or multiple carriers to obtain the modulated signal comprising the control information.

17. The non-transitory computer-readable medium according to claim 13, wherein the processor-executable instructions, when executed, further facilitate:
before sending the sending signal to the base station at the high frequency, determining to establish high frequency synchronization by detecting a primary synchronization code of a physical shared channel and a secondary synchronization code of a secondary synchronization channel; and
wherein the sending signal is sent at a synchronized high frequency.

* * * * *

UNITED STATES PATENT AND TRADEMARK OFFICE
CERTIFICATE OF CORRECTION

PATENT NO. : 10,425,175 B2  
APPLICATION NO. : 15/594321  
DATED : September 24, 2019  
INVENTOR(S) : Fan Wen et al.

Page 1 of 1

It is certified that error appears in the above-identified patent and that said Letters Patent is hereby corrected as shown below:

In the Claims

Claim 1, Column 17, Lines 8 to 9, "quality of the high frequency downlink data" should read -- quality of high frequency downlink data --.

Signed and Sealed this  
Third Day of March, 2020

Andrei Iancu  
*Director of the United States Patent and Trademark Office*